(12) United States Patent
Cao et al.

(10) Patent No.: US 10,849,176 B2
(45) Date of Patent: *Nov. 24, 2020

(54) TERMINAL DEVICE, BASE STATION, AND COMMUNICATIONS METHOD OF TERMINAL DEVICE AND BASE STATION

(71) Applicant: HUAWEI TECHNOLOGIES CO., LTD., Guangdong (CN)

(72) Inventors: Zhenzhen Cao, Beijing (CN); Mazin Ali Al-Shalash, Plano, TX (US); Bo Lin, Beijing (CN); Yongqiang Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,602

(22) Filed: Nov. 30, 2018

(65) Prior Publication Data

US 2019/0110326 A1 Apr. 11, 2019

Related U.S. Application Data

(63) Continuation of application No. 15/346,080, filed on Nov. 8, 2016, now Pat. No. 10,194,475, which is a
(Continued)

(51) Int. Cl.
*H04W 76/14* (2018.01)
*H04L 29/12* (2006.01)
(Continued)

(52) U.S. Cl.
CPC ......... *H04W 76/14* (2018.02); *H04L 61/6022* (2013.01); *H04W 28/0278* (2013.01);
(Continued)

(58) Field of Classification Search
CPC . H04W 28/02; H04W 28/0278; H04W 72/04; H04W 72/121; H04W 76/11; H04W 76/14; H04L 29/12; H04L 61/6022
See application file for complete search history.

(56) References Cited

U.S. PATENT DOCUMENTS 8,761,099 B2  6/2014  Charbit et al.
8,885,507 B2  11/2014 Chen et al.
(Continued)

FOREIGN PATENT DOCUMENTS

CN    102334370      1/2012
CN    102334370 A    1/2012
(Continued)

OTHER PUBLICATIONS

Search Report and Office Action for Russian Patent Application No. 2016147079 dated Mar. 28, 2018.
(Continued)

*Primary Examiner* — Tri H Phan
(74) *Attorney, Agent, or Firm* — Kilpatrick Townsend & Stockton LLP

(57) ABSTRACT

Information about amounts of to-be-transmitted data of a communication group may be reported to a base station, so that the base station can schedule data for the communication group. The information about the amount of the to-be-transmitted data includes identification information of the communications group, and a buffer status report of a logical channel group corresponding to the communications group.

20 Claims, 5 Drawing Sheets

Related U.S. Application Data continuation of application No. PCT/CN2014/077176, filed on May 9, 2014.

(51) Int. Cl.

| | | |
|---|---|---|
| *H04W 28/02* | (2009.01) | |
| *H04W 72/04* | (2009.01) | |
| *H04W 76/11* | (2018.01) | |
| *H04W 72/12* | (2009.01) | |

(52) U.S. Cl.
CPC .......... *H04W 72/04* (2013.01); *H04W 76/11* (2018.02); *H04W 72/121* (2013.01)

(56) References Cited

U.S. PATENT DOCUMENTS

| | | | |
|---|---|---|---|
| 9,226,274 B2* | 12/2015 | Lee | H04W 72/0406 |
| 9,258,088 B2* | 2/2016 | Lin | H04L 5/001 |
| 9,386,566 B2* | 7/2016 | Turtinen | H04W 72/0406 |
| 9,560,685 B2 | 1/2017 | Kim et al. | |
| 9,609,680 B2 | 3/2017 | Baghel et al. | |
| 9,717,092 B2* | 7/2017 | Pan | H04W 76/14 |
| 9,967,898 B2* | 5/2018 | Li | H04W 72/1242 |
| 10,045,249 B2* | 8/2018 | Lee | H04W 28/0278 |
| 10,075,940 B2* | 9/2018 | Lee | H04W 72/1215 |
| 10,123,201 B2* | 11/2018 | Loehr | H04W 8/005 |
| 10,165,573 B2* | 12/2018 | Lee | H04W 72/1215 |
| 10,194,475 B2* | 1/2019 | Cao | H04W 76/14 |
| 10,292,191 B2* | 5/2019 | Sartori | H04W 72/042 |
| 10,342,035 B2* | 7/2019 | Lee | H04W 72/1284 |
| 10,492,235 B2* | 11/2019 | Han | H04W 4/70 |
| 10,595,316 B2* | 3/2020 | Cao | H04W 72/04 |
| 2009/0113086 A1 | 4/2009 | Wu et al. | |
| 2010/0240312 A1 | 9/2010 | Peng et al. | |
| 2011/0268006 A1 | 11/2011 | Koskela et al. | |
| 2012/0106517 A1 | 5/2012 | Charbit et al. | |
| 2012/0243431 A1 | 9/2012 | Chen et al. | |
| 2013/0150061 A1 | 6/2013 | Shin et al. | |
| 2014/0003319 A1 | 1/2014 | Etemad | |
| 2014/0206372 A1 | 7/2014 | Zeng et al. | |
| 2015/0071212 A1 | 3/2015 | Kim et al. | |
| 2016/0374110 A1* | 12/2016 | Lee | H04W 72/1247 |
| 2017/0006649 A1 | 1/2017 | Zhao et al. | |
| 2017/0013634 A1 | 1/2017 | Tsuboi et al. | |
| 2017/0013638 A1 | 1/2017 | Takahashi et al. | |
| 2017/0086168 A1 | 3/2017 | Takahashi et al. | |
| 2017/0171837 A1 | 6/2017 | Chen et al. | |
| 2017/0188221 A1 | 6/2017 | Lee et al. | |
| 2017/0353950 A1 | 12/2017 | Song et al. | |
| 2019/0261237 A1* | 8/2019 | Yamazaki | H04W 36/023 |

FOREIGN PATENT DOCUMENTS

| | | |
|---|---|---|
| CN | 102792745 | 11/2012 |
| CN | 102792745 A | 11/2012 |
| CN | 102893685 A | 1/2013 |
| CN | 102958066 | 3/2013 |
| CN | 102958066 A | 3/2013 |
| RU | 2 503 153 C2 | 12/2013 |
| RU | 2503153 C2 | 12/2013 |
| WO | 2012/159270 A1 | 11/2012 |
| WO | 2012159270 A1 | 11/2012 |
| WO | 2013044718 A1 | 4/2013 |
| WO | 2013/155473 A1 | 10/2013 |
| WO | 2013155413 | 10/2013 |
| WO | 2013155413 A1 | 10/2013 |
| WO | 2013155473 A1 | 10/2013 |
| WO | 2013157906 | 10/2013 |
| WO | 2013157906 A1 | 10/2013 |

OTHER PUBLICATIONS

Chinese Office Action for CN Application No. 201480078326.4 dated Nov. 23, 2018.
International Search Report, dated Jan. 28, 2015, in International Application No. PCT/CN2014/077176 (4 pp.).
Extended European Search Report, dated Mar. 22, 2017, in European Application No. 14891160.5 (8 pp.).
Resource allocation for D2D transmitters in coverage, 3GPP TSG-RAN WG2 #85, Prague, Czech Republic, Feb. 10-14, 2014, Tdoc R2-140625, pp. 1-5.
3rd Generation Partnership Project; Technical Specification Group Radio Access Network; Evolved Universal Terrestrial Radio Access (E-UTRA); Medium Access Control (MAC) protocol specification (Release 12), 3GPP TS 36.321 V12.1.0 (Mar. 2014), pp. 1-57.
3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.1.0 (Mar. 2014), pp. 1-356.
Office Action for U.S. Appl. No. 15/346,080 dated Apr. 2, 2018.
Notice of Allowance for U.S. Appl. No. 15/346,080 dated Sep. 10, 2018.
U.S. Appl. No. 15/346,080, filed Nov. 8, 2016, Zhenzhen Cao, Huawei Technologies Co., Ltd.
R2-140625 Ericsson:"Resource allocation for D2D transmitters in coverage", 3GPP TSG-RAN WG2 #85, Prague, Czech Republic, Feb. 10-14, 2014, 5 pages.
3GPP TS 36321 V12.1.0 (Mar. 2014), 3rd Generation Partnership Project; Technical Specification Group Radio Access Network;Evolved Universal Terrestrial Radio Access (E-UTRA);Medium Access Control (MAC) protocol specification (Release 12), total 57 pages.
3GPP TS 36331 V12.1.0 (Mar. 2014), 3rd Generation Partnership Project; Technical Specification Group Radio Access Network; Evolved Universal Terrestrial Radio Access (E-UTRA); Radio Resource Control (RRC); Protocol specification (Release 12), total 356 pages.
International Search Report for PCT/CN2014/077176 dated May 9, 2014.
Russian Office Action for Russian Application No. 2016147079 dated Mar. 28, 2018.
Chinese Office Action for Chinese Application No. 201480078326.4 dated Nov. 23, 2018.
Extended European Search Report for European Application No. 14891160.5 dated Mar. 22, 2017.
European Notice of Allowance for European Application No. 14891160.5 dated Dec. 7, 2018.

\* cited by examiner

| LCG #0 | |
|---|---|
| Buffer Size #0 | LCG #1 |
| LCG #1 | Buffer Size #1 |
| Buffer Size #1 | LCG #2 |
| LCG #2 | Buffer Size #2 |
| Buffer Size #2 | LCG #3 |
| LCG #3 | Buffer Size #3 |
| ... | |

FIG. 5

TERMINAL DEVICE, BASE STATION, AND COMMUNICATIONS METHOD OF TERMINAL DEVICE AND BASE STATION

CROSS-REFERENCE TO RELATED APPLICATIONS

This application is a continuation of U.S. patent application Ser. No. 15/346,080, filed on Nov. 8, 2016, which is a continuation of International Application No. PCT/CN2014/ 077176, filed on May 9, 2014, All of the afore-mentioned patent applications are hereby incorporated by reference in their entireties.

TECHNICAL FIELD

Embodiments of the present invention relate to the communications field, and in particular, to terminal device, a base station, and a communications method of the terminal device and the base station.

BACKGROUND

In an existing cellular communications technology, a user terminal communicates with a base station by using an air interface, and forwards user data to a destination node in a network through the base station.

A device-to-device (D2D) communications technology is a technology of direct communication between terminals. A difference from the existing cellular communications technology is that, data of user equipment does not need to be transmitted by a base station, but is transmitted directly by using an air interface between terminals, thereby reducing a delay of network forwarding. A typical application scenario is a public safety scenario, for example, communication between members of a fire alarm group.

A resource used by traditional user equipment for transmitting data may be scheduled by a base station in a cellular network. That is, the user equipment reports, to the base station by using a buffer status report (BSR), an amount of data waiting to be sent, and the base station schedules a data resource according to the BSR.

However, a D2D device may belong to multiple communications groups at the same time, for example, a device may belong to both a fire alarm group and a police group. When a D2D device needs to report buffer status reports of multiple different communications groups, a traditional BSR mechanism cannot be applied to a case in which there are multiple communications groups. That is, in the existing BSR mechanism, to-be-transmitted buffer data of multiple communications groups cannot be reported, and therefore a base station cannot schedule a resource for the D2D device.

SUMMARY

In view of this, embodiments of the present invention provide a communications method, which is used for a BSR mechanism between a D2D device and a base station, so as to implement resource scheduling for different communications groups.

According to an embodiment of the present invention, user equipment UE is provided, where the UE is a device-to-device D2D device, the UE belongs to at least one communications group, each communications group is corresponding to at least one logical channel group, and the UE includes: a processing unit, configured to determine identification information of a currently-enabled communications group; and configured to generate information about an amount of to-be-transmitted data, where the information about the amount of the to-be-transmitted data includes the identification information of the currently-enabled communications group, and a buffer status report of a logical channel group corresponding to the currently-enabled communications group, and the amount of the to-be-transmitted data is an amount of data to be transmitted between the UE and another D2D device in the currently-enabled communications group; a sending unit, configured to send the information about the amount of the to-be-transmitted data to a base station; and a receiving unit, configured to receive information that is about a resource and sent by the base station, where the resource is allocated by the base station for the currently-enabled communications group, and the information about the resource includes the identification information of the currently-enabled communications group, where the sending unit is further configured to transmit data in the currently-enabled communications group by using the resource.

Optionally, the identification information of the currently-enabled communications group includes an index number of the currently-enabled communications group.

Optionally, the index number of the currently-enabled communications group is obtained according to a sequence, in a list, of the identification information of the currently-enabled communications group, and the list includes identification information of all the currently-enabled communications groups.

Optionally, the sending unit is further configured to send the list to the base station.

Optionally, that the sending unit is configured to send the information about the amount of the to-be-transmitted data to the base station includes: sending at least one MAC control element to the base station, where each MAC control element includes information about an amount of to-be-transmitted data of one of the currently-enabled communications groups.

Optionally, that the sending unit is configured to send the information about the amount of the to-be-transmitted data to the base station includes: sending one Media Access Control MAC control element to the base station, where the MAC control element includes the information about the amount of the to-be-transmitted data of the currently-enabled communications group that has data to be sent.

Optionally, that the processing unit is configured to generate the information about the amount of the to-be-transmitted data includes:

when there is only one currently-enabled communications group, generating information about an amount of to-be-transmitted data, where the information about the amount of the to-be-transmitted data does not include identification information of the currently-enabled communications group, but includes a buffer status report of a logical channel group corresponding to the currently-enabled communications group; and/or when there are at least two currently-enabled communications groups, generating information about an amount of to-be-transmitted data, where the information about the amount of the to-be-transmitted data includes identification information of the currently-enabled communications groups, and buffer status reports of logical channel groups corresponding to the currently-enabled communications groups, and the amount of the to-be-transmitted data is an amount of data to be transmitted between the UE and other D2D devices in the currently-enabled communications groups.

Optionally, before the UE generates the information about the amount of the to-be-transmitted data, the processing unit is further configured to: when it is determined that a buffer of at least one of the currently-enabled communications groups changes from a state of having no data waiting to be sent to a state of having data waiting to be sent, control the UE to enter a BSR triggering state; or further configured to: when it is determined that a buffer of at least one of the currently-enabled communications groups changes from a state of having no data waiting to be sent to a state of having data waiting to be sent, and a priority of the communications group is higher than a priority of another communications group that has data waiting to be sent, control the UE to enter a triggering state.

Optionally, the identification information of the currently-enabled communications group includes an identifier of the logical channel group corresponding to the currently-enabled communications group; and
the information about the amount of the to-be-transmitted data includes the identifier of the logical channel group of the currently-enabled communications group, and the buffer status report of the logical channel group corresponding to the currently-enabled communications group.

Optionally, that the sending unit is configured to send the information about the amount of the to-be-transmitted data to the base station includes: sending one MAC control element to the base station, where the MAC control element includes information about an amount of to-be-transmitted data of a logical channel group that has data to be sent.

Optionally, identifiers of logical channel groups corresponding to different communications groups are different, and identifiers of different logical channel groups of a same communications group are different.

According to an embodiment of the present invention, a base station is provided and configured to communicate with user equipment UE, where the user equipment is a device-to-device D2D device, the UE belongs to at least one communications group, each communications group is corresponding to at least one logical channel group, and the base station includes: a receiving unit, configured to receive information that is about an amount of to-be-transmitted data and sent by the UE, where the information about the amount of the to-be-transmitted data includes identification information of a currently-enabled communications group, and a buffer status report of a logical channel group corresponding to the currently-enabled communications group, and the amount of the to-be-transmitted data is an amount of data to be transmitted between the UE and another D2D device in the currently-enabled communications group; a processing unit, configured to allocate a resource to the UE according to the information about the amount of the to-be-transmitted data, where the resource is allocated for the currently-enabled communications group, and send information about the resource to the UE by using a sending unit, where the information includes the identification information of the currently-enabled communications group; and the sending unit, configured to send the information about the resource to the UE.

Optionally, the identification information of the currently-enabled communications group includes an index number of the currently-enabled communications group.

Optionally, the index number of the currently-enabled communications group is obtained according to a sequence, in a list, of the identification information of the currently-enabled communications group, and the list includes identification information of all the currently-enabled communications groups.

Optionally, the receiving unit is further configured to receive the list.

Optionally, that the receiving unit is configured to receive the information that is about the amount of the to-be-transmitted data and sent by the UE includes: receiving at least one Media Access Control MAC control element, where each MAC control element includes information about an amount of to-be-transmitted data of one of the currently-enabled communications groups.

Optionally, that the receiving unit is configured to receive the information that is about the amount of the to-be-transmitted data and sent by the UE includes: receiving one MAC control element, where the MAC control element includes the information about the amount of the to-be-transmitted data of the currently-enabled communications group that has data to be sent.

Optionally, the identification information of the currently-enabled communications group includes an identifier of the logical channel group corresponding to the currently-enabled communications group; and the information about the amount of the to-be-transmitted data includes the identifier of the logical channel group of the currently-enabled communications group, and the buffer status report of the logical channel group of the currently-enabled communications group.

Optionally, that the receiving unit is configured to receive the information that is about the amount of the to-be-transmitted data and sent by the UE includes: receiving one MAC control element, where the MAC control element includes information about an amount of to-be-transmitted data of a logical channel group that has data to be sent.

Optionally, identifiers of logical channel groups corresponding to different communications groups are different, and identifiers of different logical channel groups of a same communications group are different.

According to an embodiment of the present invention, a communications method is provided, where user equipment UE is a device-to-device D2D device, the UE belongs to at least one communications group, each communications group is corresponding to at least one logical channel group, and the method includes the following steps: determining, by the UE, identification information of a currently-enabled communications group; generating, by the UE, information about an amount of to-be-transmitted data, where the information about the amount of the to-be-transmitted data includes the identification information of the currently-enabled communications group, and a buffer status report of a logical channel group corresponding to the currently-enabled communications group, and the amount of the to-be-transmitted data is an amount of data to be transmitted between the UE and another D2D device in the currently-enabled communications group; sending, by the UE, the information about the amount of the to-be-transmitted data to a base station; receiving, by the UE, information about a resource, where the resource is allocated by the base station for the currently-enabled communications group, and the information about the resource includes the identification information of the currently-enabled communications group; and transmitting, by the UE, data in the currently-enabled communications group by using the resource.

Optionally, the identification information of the currently-enabled communications group includes an index number of the currently-enabled communications group.

Optionally, the index number of the currently-enabled communications group is obtained according to a sequence, in a list, of the identification information of the currently-enabled communications group, and the list includes identification information of all the currently-enabled communications groups.

Optionally, the method includes: sending the list to the base station.

Optionally, the sending, by the UE, the information about the amount of the to-be-transmitted data to a base station is specifically: sending, by the UE, at least one Media Access Control MAC control element to the base station, where each MAC control element includes information about an amount of to-be-transmitted data of one of the currently-enabled communications groups.

Optionally, the sending, by the UE, the information about the amount of the to-be-transmitted data to a base station is specifically: sending, by the UE, one MAC control element to the base station, where the MAC control element includes the information about the amount of the to-be-transmitted data of the currently-enabled communications group that has data to be sent.

Optionally, when there is only one currently-enabled communications group, the information that is about the amount of the to-be-transmitted data and generated by the UE does not include identification information of the currently-enabled communications group, but includes a buffer status report of a logical channel group corresponding to the currently-enabled communications group; and/or when there are at least two currently-enabled communications groups, information about an amount of to-be-transmitted data is generated, where the information about the amount of the to-be-transmitted data includes identification information of the currently-enabled communications groups, and buffer status reports of logical channel groups corresponding to the currently-enabled communications groups, and the amount of the to-be-transmitted data is an amount of data to be transmitted between the UE and other D2D devices in the currently-enabled communications groups.

Optionally, before the generating, by the UE, information about an amount of to-be-transmitted data, the method includes: when it is determined that a buffer of at least one of the currently-enabled communications groups changes from a state of having no data waiting to be sent to a state of having data waiting to be sent, entering, by the UE, a triggering state; or when it is determined that a buffer of at least one of the currently-enabled communications groups changes from a state of having no data waiting to be sent to a state of having data waiting to be sent, and a priority of the communications group is higher than a priority of another communications group that has data waiting to be sent, entering, by the UE, a triggering state.

Optionally, the identification information of the currently-enabled communications group includes an identifier of the logical channel group corresponding to the currently-enabled communications group; and the information about the amount of the to-be-transmitted data includes the identifier of the logical channel group of the currently-enabled communications group, and the buffer status report of the logical channel group corresponding to the currently-enabled communications group.

Optionally, the sending the information about the amount of the to-be-transmitted data to a base station is specifically:
sending, by the UE, one MAC control element to the base station, where the MAC control element includes information about an amount of to-be-transmitted data of a logical channel group that has data to be sent.

Optionally, identifiers of logical channel groups corresponding to different communications groups are different, and identifiers of different logical channel groups of a same communications group are different.

According to an embodiment of the present invention, a communications method is provided and used for communication with user equipment UE, where the user equipment UE is a device-to-device D2D device, the UE belongs to at least one communications group, each communications group is corresponding to at least one logical channel group, and the method includes the following steps: receiving, by a base station, information that is about an amount of to-be-transmitted data and sent by the UE, where the information about the amount of the to-be-transmitted data includes identification information of a currently-enabled communications group, and a buffer status report of a logical channel group corresponding to the currently-enabled communications group, and the amount of the to-be-transmitted data is an amount of data to be transmitted between the UE and another D2D device in the currently-enabled communications group; allocating, by the base station, a resource to the UE according to the information about the amount of the to-be-transmitted data, where the resource is allocated for the currently-enabled communications group, and sending information about the resource to the UE by using a sending unit, where the information includes the identification information of the currently-enabled communications group; and sending, by the base station, the information about the resource to the UE.

Optionally, the identification information of the currently-enabled communications group includes an index number of the currently-enabled communications group.

Optionally, the index number of the currently-enabled communications group is obtained according to a sequence, in a list, of the identification information of the currently-enabled communications group, and the list includes identification information of all the currently-enabled communications groups.

Optionally, the method includes: receiving, by the base station, the list.

Optionally, the receiving, by a base station, information that is about an amount of to-be-transmitted data and sent by the UE is specifically: receiving, by the base station, at least one Media Access Control MAC control element, where each MAC control element includes information about an amount of to-be-transmitted data of one of the currently-enabled communications groups.

Optionally, the receiving, by a base station, information that is about an amount of to-be-transmitted data and sent by the UE is specifically: receiving, by the base station, one MAC control element, where the MAC control element includes the information about the amount of the to-be-transmitted data of the currently-enabled communications group that has data to be sent.

Optionally, the identification information of the currently-enabled communications group includes an identifier of the logical channel group corresponding to the currently-enabled communications group; and the information about the amount of the to-be-transmitted data includes the identifier of the logical channel group of the currently-enabled communications group, and the buffer status report of the logical channel group of the currently-enabled communications group.

Optionally, the receiving, by a base station, information that is about an amount of to-be-transmitted data and sent by the UE is specifically: receiving, by the base station, one MAC control element, where the MAC control element includes information about an amount of to-be-transmitted data of a logical channel group that has data to be sent.

Optionally, identifiers of logical channel groups corresponding to different communications groups are different, and identifiers of different logical channel groups of a same communications group are different.

According to an embodiment of the present invention, user equipment UE is provided, where the UE is a device-to-device D2D device, the UE belongs to at least one communications group, each communications group is corresponding to at least one logical channel group, and the UE includes: a processor, configured to determine identification information of a currently-enabled communications group; and configured to generate information about an amount of to-be-transmitted data, where the information about the amount of the to-be-transmitted data includes the identification information of the currently-enabled communications group, and a buffer status report of a logical channel group corresponding to the currently-enabled communications group, and the amount of the to-be-transmitted data is an amount of data to be transmitted between the UE and another D2D device in the currently-enabled communications group; a sender, configured to send the information about the amount of the to-be-transmitted data to a base station; and a receiver, configured to receive information that is about a resource and sent by the base station, where the resource is allocated by the base station for the currently-enabled communications group, and the information about the resource includes the identification information of the currently-enabled communications group, where the sender is further configured to transmit data in the currently-enabled communications group by using the resource.

According to an embodiment of the present invention, a base station is provided and configured to communicate with user equipment UE, where the user equipment is a device-to-device D2D device, the UE belongs to at least one communications group, each communications group is corresponding to at least one logical channel group, and the base station includes: a receiver, configured to receive information that is about an amount of to-be-transmitted data and sent by the UE, where the information about the amount of the to-be-transmitted data includes identification information of a currently-enabled communications group, and a buffer status report of a logical channel group corresponding to the currently-enabled communications group, and the amount of the to-be-transmitted data is an amount of data to be transmitted between the UE and another D2D device in the currently-enabled communications group; a processor, configured to allocate a resource to the UE according to the information about the amount of the to-be-transmitted data, where the resource is allocated for the currently-enabled communications group, and send information about the resource to the UE by using a sender, where the information includes the identification information of the currently-enabled communications group; and the sender, configured to send the information about the resource to the UE.

In the foregoing solution, a UE may determine identification information of a currently-enabled communications group, generate information about an amount of to-be-transmitted data, and send the information about the amount of the to-be-transmitted data to a base station, where the information about the amount of the to-be-transmitted data includes the identification information of the currently-enabled communications group, so that the base station can distinguish between different communications groups, and separately schedule resources for data of the communications groups.

BRIEF DESCRIPTION OF DRAWINGS

FIG. 5 shows another implementation solution according to an embodiment of the present invention.

DESCRIPTION OF EMBODIMENTS

To make the objectives, technical solutions, and advantages of embodiments of the present invention clearer, the following further describes the embodiments of the present invention in detail with reference to the accompanying drawings.

An embodiment of the present invention provides a communications method, which can be applied to a D2D device and a base station of the D2D device. A base station in the present invention is not limited to in a scenario of an evolved NodeB (eNB), and may be in another scenario. In practice, the base station may be a base station of another technology, such as a Universal Mobile Telecommunications System (UMTS), a Global System for Mobile Communications (GSM), or a Worldwide Interoperability for Microwave Access (WiMAX).

Figure 1:
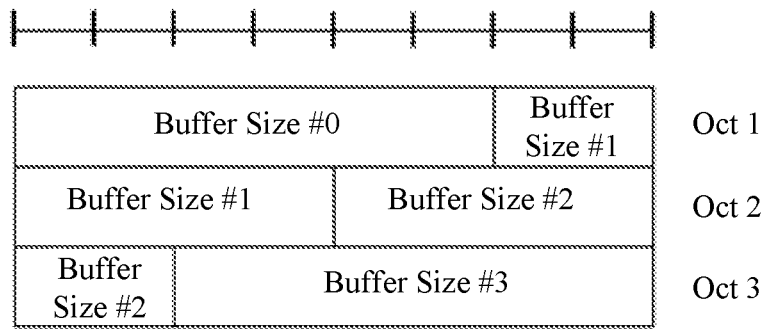
FIG. 1 shows a solution in which a BSR is reported for uplink data transmission in an LTE network.

In a Long Term Evolution (LTE) network, user equipment (UE) reports, to a base station by using a BSR, an amount of data that is buffered in an uplink buffer and waits to be sent. Information about the amount of the to-be-transmitted data includes a BSR of a logical channel group. In the LTE network, a target to which the UE sends data is only the base station, and therefore the BSR needs to include only the information about the amount of the to-be-transmitted data sent to the base station. FIG. 1 shows a solution in which a BSR is reported for uplink data transmission in an LTE network. Each Oct represents one byte, including 8 bits. In this solution, four logical channel groups are included, and a BSR of each logical channel group occupies 6 bits, for example, Buffer Size #0 of logical channel group #0 occupies 6 bits.

In D2D communications, one UE may belong to multiple communications groups at the same time, for example, one UE may belong to both a fire alarm group and a police group. Each communications group is further corresponding to multiple different logical channel groups. Data that waits to be sent to multiple communications groups may exist in a buffer of the UE at the same time. Therefore, the BSR shown in FIG. 1 cannot meet the foregoing requirement.

In the embodiments of the present invention, the foregoing problem can be solved by adding an identifier of a communications group to information about an amount of to-be-transmitted data in a D2D scenario.

Figure 2:
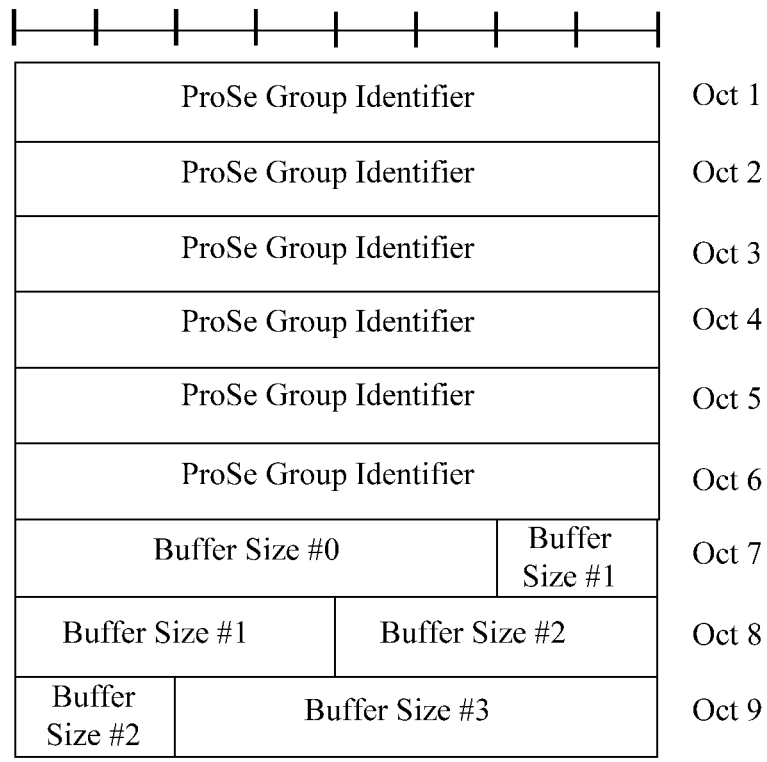
FIG. 2 shows an implementation solution according to an embodiment of the present invention.

FIG. 2 shows an implementation solution according to an embodiment of the present invention. In this solution, a UE may belong to different communications groups, and multiple communications groups may be currently enabled for communication. In the embodiment shown in FIG. 2, information that is about an amount of to-be-transmitted data and reported by the UE includes an identifier of a currently-enabled communications group (ProSe Group Identifier). The ProSe is an abbreviation of proximity service (proximity service). As shown in FIG. 2, the identifier of the communications group occupies 6 bytes, that is, 48 bits in total. The information about the amount of the to-be-transmitted data further includes buffer status reports of logical channel groups corresponding to the currently-enabled communications group. Each buffer status report identifies an amount of data to be transmitted between the UE and another D2D device in the currently-enabled communications group. Buffer Size #0 indicates an amount of data waiting to be transmitted by the UE in logical channel group #0 corresponding to the communications group. There are totally four such buffer status reports, which are respectively Buffer Size #0, Buffer Size #1, Buffer Size #2, and Buffer Size #3. Each buffer status report occupies 6 bits, and the buffer status reports are successively concatenated.

Figure 6:
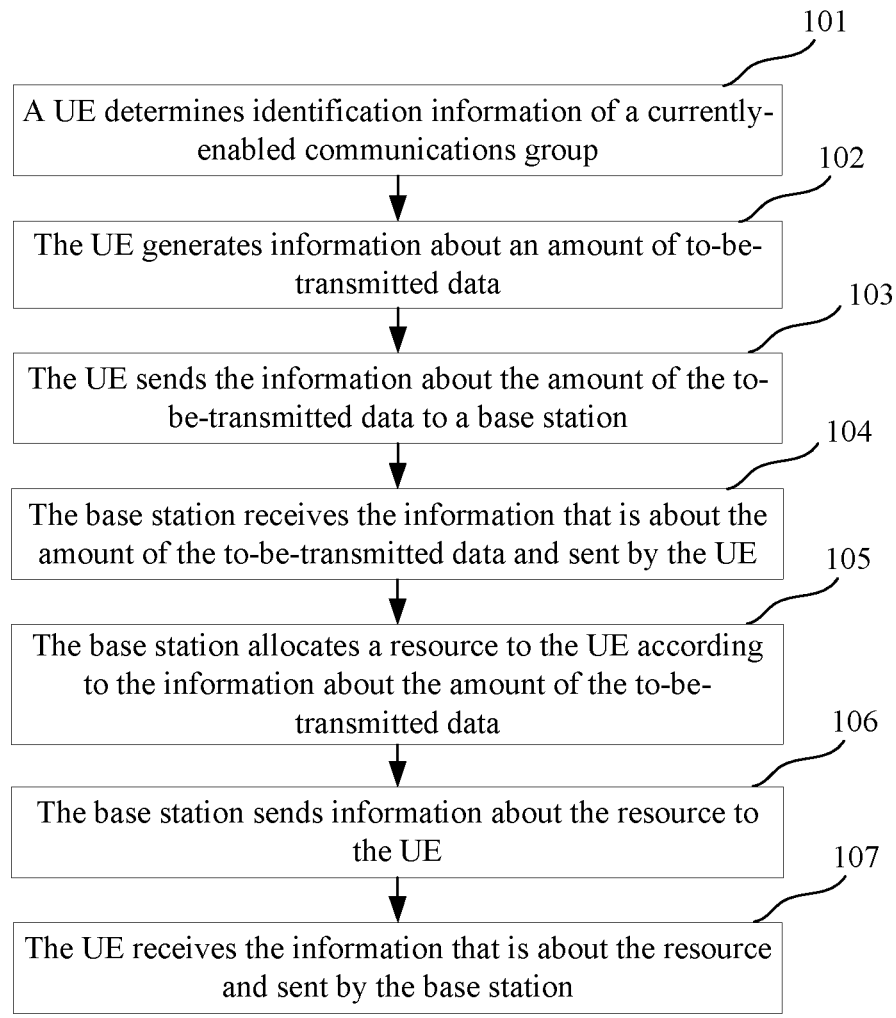
FIG. 6 shows a method according to an embodiment of the present invention.
Figure 7:
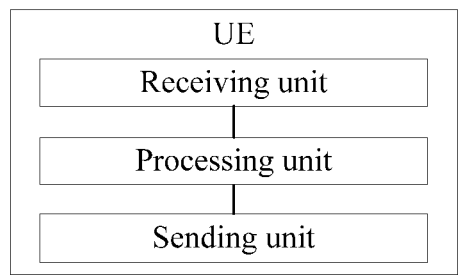
FIG. 7 shows a UE according to an embodiment of the present invention.
Figure 8:
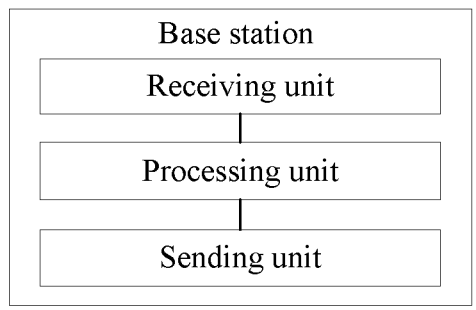
FIG. 8 shows a base station according to an embodiment of the present invention.
Figure 9:
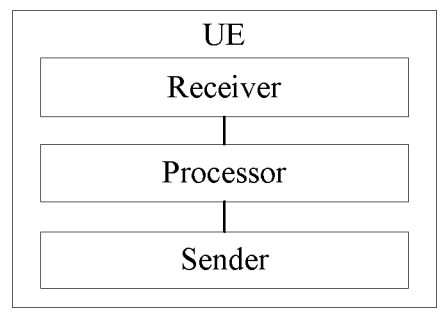
FIG. 9 shows another UE according to an embodiment of the present invention.
Figure 10:
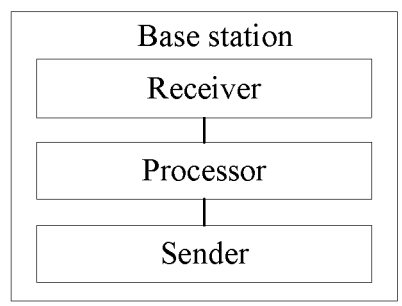
FIG. 10 shows another base station according to an embodiment of the present invention.

As shown in FIG. 6, a method embodiment of the present invention includes the following steps:

101. A UE determines identification information of a currently-enabled communications group.

The identification information of the communications group may include a unique identifier of the communications group. The unique identifier may uniquely identify the communications group in an entire network.

102. The UE generates information about an amount of to-be-transmitted data, where the information about the amount of the to-be-transmitted data includes the identification information of the currently-enabled communications group, and a buffer status report of a logical channel group corresponding to the currently-enabled communications group, and the amount of the to-be-transmitted data is an amount of data to be transmitted between the UE and another D2D device in the currently-enabled communications group.

103. The UE sends the information about the amount of the to-be-transmitted data to a base station.

104. The base station receives the information that is about the amount of the to-be-transmitted data and sent by the UE.

105. The base station allocates a resource to the UE according to the information about the amount of the to-be-transmitted data, where the resource is allocated for the currently-enabled communications group.

For example, in the embodiment in FIG. 2, a base station allocates, according to an identifier of a communications group (ProSe Group Identifier) and amounts of to-be-transmitted data indicated by buffer status reports Buffer Size #0, Buffer Size #1, Buffer Size #2, and Buffer Size #3 corresponding to the communications group, corresponding resources to logical channel groups corresponding to these buffer status reports in the communications group.

106. The base station sends, to the UE, information about the resource allocated to the UE. The information about the resource includes an identifier of the currently-enabled communications group. In addition to the identifier of the communications group, the information about the resource may include the resource allocated to the UE.

The UE receives the information about the resource, where the information about the resource includes the identifier of the currently-enabled communications group and the resource allocated to the UE. The UE transmits data corresponding to the currently-enabled communications group by using the resource.

It may be learned that, in this embodiment of the present invention, identifiers of different communications groups and buffer status reports of logical channel groups corresponding to the communications groups are transmitted to a base station, and the base station can distinguish between different communications groups and further schedule resources for the different communications groups.

Figure 3:
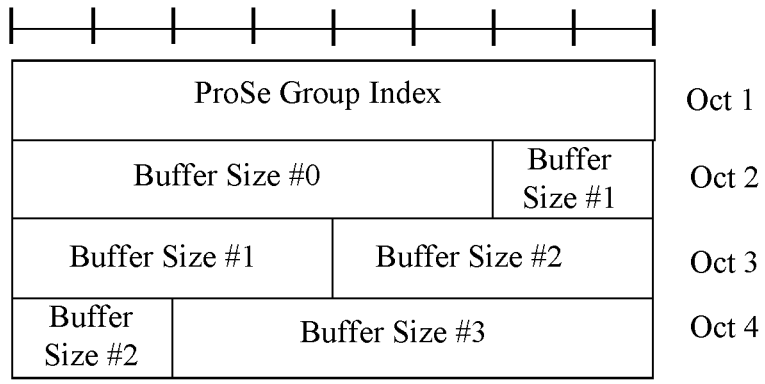
FIG. 3 shows another implementation solution according to an embodiment of the present invention.

An identifier of a communications group (ProSe Group Identifier) in FIG. 2 occupies 48 bits, which increases a signaling overhead in a system. In FIG. 3, the identifier of the communications group is replaced with an index number of the communications group (ProSe Group Index). For a UE, the UE needs to determine an index number corresponding to a unique identifier of a communications group; for a base station, the base station needs to obtain the unique identifier of the communications group according to a received index number by means of table lookup and the like. An index number of a currently-enabled communications group occupies relatively less bytes. In FIG. 3, one byte is used as an example, and it may be understood that a length of the index number may be another length.

In the embodiment in FIG. 3, an index number of one communications group and buffer status reports of logical channel groups corresponding to the communications group form information about an amount of to-be-transmitted data of the communications group. When sending the information about the amount of the to-be-transmitted data of the communications group, a UE may use the information about the amount of the to-be-transmitted data of the communications group as one Media Access Control (MAC) control element for sending. Different communications groups use different MAC control elements for sending. A base station obtains identifiers of corresponding communications groups and buffer status reports of corresponding logical channel groups by using the different MAC control elements.

It may be understood that the identification information of the communications group is not limited to the identifier of the communications group and the index number of the communications group, and may further include another piece of information that can identify the communications group.

It may be learned that in addition to having advantages of the embodiment in FIG. 2, the embodiment in FIG. 3 saves a signaling resource.

For a solution in which an index number is used in the foregoing embodiment, an embodiment of the present invention provides a specific implementation solution.

Firstly, a UE reports, to a base station, a list of currently-enabled communications groups to which the UE belongs, where the list includes unique identifiers of all the currently-enabled communications groups, such as {an identifier of communications group A, an identifier of communications group B, and an identifier of communications group C}; the list may further include priority information corresponding to all the currently-enabled communications groups, where the priority information indicates a transmission priority of the communications groups.

Secondly, the UE may acquire index numbers corresponding to the communications groups according to a sequence of the communications groups in the list. For example, the first element in the foregoing list is communications group A, and an index number corresponding to communications group A is 1; the second element is communications group B, and an index number corresponding to communications group B is 2.

Thirdly, the UE generates information about an amount of to-be-transmitted data according to the foregoing index numbers, and sends the information to the base station.

Fourthly, the base station determines the unique identifiers of the currently-enabled communications groups according to the index numbers included in the received information about the amount of the to-be-transmitted data and the list, and allocates resources to the communications groups corresponding to the unique identifiers.

The UE transmits data on specified resources according to information about the allocated resources. A process is the same as that of a technical solution in FIG. 2, and details are not described herein.

It should be noted that the list that is of the communications groups and is used by the base station may be reported by the UE, or may be obtained by using another means. For example, the base station may preset the list of the communications groups, or another device notifies the base station of the list of the communications groups. Correspondingly, the UE may send the list to the base station before the UE generates the information about the amount of the to-be-transmitted data, or after the UE generates the information about the amount of the to-be-transmitted data.

It may be learned that the foregoing embodiment in which an index number and a list are used provides another implementation manner, which improves flexibility of a technical solution, and the solution further has the following advantages: A UE determines an index number by using a set list, which can prevent directly adding identification information of a communications group into information about an amount of to-be-transmitted data when the information about the amount of the to-be-transmitted data is being sent. Therefore, a signaling resource can be saved, and the information about the amount of the to-be-transmitted data can carry more BSR information.

Figure 4:
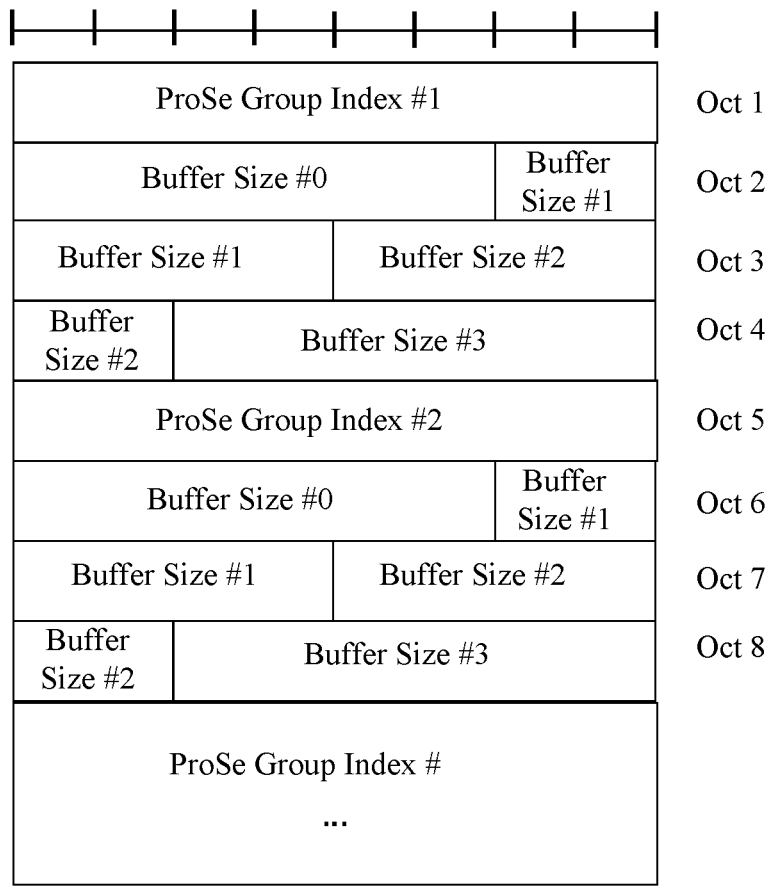
FIG. 4 shows another implementation solution according to an embodiment of the present invention.

FIG. 4 shows another embodiment of the present invention. An index number of one communications group and buffer status reports of logical channel groups corresponding to the communications group form information about an amount of to-be-transmitted data of the communications group. When sending the information about the amount of the to-be-transmitted data of the communications group, a UE may successively concatenate multiple pieces of the information about the amount of the to-be-transmitted data as one MAC control element for sending. A base station obtains identifiers of different communications groups and buffer status reports of logical channel groups corresponding to the communications groups by using the MAC control element.

It should be noted that if the concatenated control element has too many communications groups or too many logical channel groups, the control element may be divided into multiple control elements that are then separately sent to the base station. Each control element obtained by means of division includes one header. Division of the control element may be specifically performed according to a channel condition, for example, division is performed according to a size of an uplink resource allocated by the base station.

It may be learned that, in the embodiment in FIG. 4, more MAC control elements are not needed, and therefore only less MAC headers need to be sent. Therefore, in addition to having advantages of the foregoing embodiments, the embodiment in FIG. 4 reduces headers and further saves a signaling resource.

According to another embodiment of the present invention, a solution is as follows:

Before generating information about an amount of to-be-transmitted data, a UE determines whether there is only one currently-enabled communications group:

When there is only one currently-enabled communications group, information that is about an amount of to-be-transmitted data and generated by the UE does not include identification information of the currently-enabled communications group, but includes a buffer status report of a logical channel group corresponding to the currently-enabled communications group. For example, in the scenario in FIG. 2, if there is only one currently-enabled communications group, the UE does not need to send the ProSe Group Identifier. A corresponding base station may not need an identifier of the communications group either, and may directly allocate a resource for the logical channel group. It may be learned that in such a solution, an identifier of a communications group does not need to be transmitted, which saves a signaling overhead.

When there are at least two currently-enabled communications groups, information about an amount of to-be-transmitted data is generated, where the information about the amount of the to-be-transmitted data includes identification information of the currently-enabled communications groups, and buffer status reports of logical channel groups corresponding to the currently-enabled communications groups, and the amount of the to-be-transmitted data is an amount of data to be transmitted between the UE and other D2D devices in the currently-enabled communications groups.

After the information about the amount of the to-be-transmitted data is generated, for a subsequent implementation solution, refer to the foregoing embodiments, and details are not described herein again.

According to another embodiment of the present invention, a solution is as follows:

Before generating information about an amount of to-be-transmitted data, a UE enters a triggering state. A process of entering the triggering state may be as follows:

When it is determined that a buffer of at least one of the currently-enabled communications groups changes from a state of having no data waiting to be sent to a state of having data waiting to be sent, the UE enters the triggering state; or when it is determined that a buffer of at least one of the currently-enabled communications groups changes from a state of having no data waiting to be sent to a state of having data waiting to be sent, and a priority of the communications group is higher than a priority of another communications group that has data waiting to be sent, the UE enters the triggering state.

The UE notifies a base station that the UE enters the triggering state, and the base station may allocate, to the UE, a resource used for reporting a buffer status report. After the UE obtains the allocated resource, the UE generates the information about the amount of the to-be-transmitted data and performs subsequent steps. Other steps are the same as those in the foregoing embodiments, and details are not described again.

It may be learned that in addition to having advantages of the embodiment in FIG. 3, this embodiment has the following advantages: When a UE has a new communications group that has data waiting to be sent, or a communications group that is of a higher priority and has data waiting to be sent, the UE may report information about a buffer status report of the communications group to a base station in a timely manner, where the buffer status report is used by the base station to schedule data in a timely manner, thereby further accelerating data transmission.

FIG. 5 shows another embodiment of the present invention. Identification information of a currently-enabled communications group may include identifiers of logical channel groups corresponding to the currently-enabled communications group. In an example in FIG. 5, the identifiers of the logical channel groups are LCG #0, LCG #1, . . . . A length of an identifier of each logical channel group may be 8 bits, or may be another length. The identifier of each logical channel group is followed by a buffer status report of the logical channel group. Identifiers of logical channel groups corresponding to different communications groups are different, and identifiers of different logical channel groups of a same communications group are different. In other words, identifiers of the logical channel groups may identify communications groups corresponding to the logical channel groups. In this way, a UE or a base station may know information about the corresponding communications groups according to the identifiers of the logical channel groups. Identifiers of multiple logical channel groups corresponding to a communications group and buffer status reports of the logical channel groups corresponding to the communications group form information about an amount of to-be-transmitted data of one or more communications groups.

In addition, when sending the information about the amount of the to-be-transmitted data of the one or more communications groups, the UE may successively concatenate the multiple pieces of information about the amount of the to-be-transmitted data as one MAC control element for sending. The MAC control element includes information about an amount of to-be-transmitted data of a logical channel group that has data to be sent. The base station obtains, by using the MAC control element, identifiers of different logical channel groups and buffer status reports that are corresponding to the MAC control element.

In addition to having advantages of the foregoing embodiments, the embodiment in FIG. 5 has the following advantages: An identifier of a logical channel group may indicate information of a communications group corresponding to the logical channel group, which provides another implementation manner and improves flexibility of a technical solution.

It should be noted that the logical channel groups may be spaced but not consecutive. For example, logical channel group #1 has no data to be sent, and the MAC control element may successively include LCG #0 and a buffer status report of LCG #0, LCG #2 and a buffer status report of LCG #2, . . . . Because an identifier of each logical channel group and a buffer status report corresponding to each logical channel group are indicated, logical channel groups having no sequence can be successively transmitted, so that a signaling resource is saved.

According to an embodiment of the present invention, user equipment UE is provided, where the UE is a device-to-device D2D device, the UE belongs to at least one communications group, each communications group is corresponding to at least one logical channel group, and the UE includes: a processing unit, configured to determine identification information of a currently-enabled communications group; and configured to generate information about an amount of to-be-transmitted data, where the information about the amount of the to-be-transmitted data includes the identification information of the currently-enabled communications group, and a buffer status report of a logical channel group corresponding to the currently-enabled communications group, and the amount of the to-be-transmitted data is an amount of data to be transmitted between the UE and another D2D device in the currently-enabled communications group; a sending unit, configured to send the information about the amount of the to-be-transmitted data to a base station; and a receiving unit, configured to receive information that is about a resource and sent by the base station, where the resource is allocated by the base station for the currently-enabled communications group, and the information about the resource includes the identification information of the currently-enabled communications group, where the sending unit is further configured to transmit data in the currently-enabled communications group by using the resource.

According to this embodiment of the present invention, the identification information of the currently-enabled communications group includes an index number of the currently-enabled communications group, or includes a unique identifier of the currently-enabled communications group.

According to this embodiment of the present invention, the index number of the currently-enabled communications group is obtained according to a sequence, in a list, of the unique identifier of the currently-enabled communications group, and the list includes unique identifiers of all the currently-enabled communications groups.

According to this embodiment of the present invention, the sending unit is further configured to send the list to the base station.

According to this embodiment of the present invention, that the sending unit is configured to send the information about the amount of the to-be-transmitted data to the base station includes: sending at least one MAC control element to the base station, where each MAC control element includes information about an amount of to-be-transmitted data of one of the currently-enabled communications groups.

According to this embodiment of the present invention, that the sending unit is configured to send the information about the amount of the to-be-transmitted data to the base station includes: sending one Media Access Control MAC control element to the base station, where the MAC control element includes the information about the amount of the to-be-transmitted data of the currently-enabled communications group that has data to be sent.

According to this embodiment of the present invention, that the processing unit is configured to generate the information about the amount of the to-be-transmitted data includes: when there is only one currently-enabled communications group, generating information about an amount of to-be-transmitted data, where the information about the amount of the to-be-transmitted data does not include identification information of the currently-enabled communications group, but includes a buffer status report of a logical channel group corresponding to the currently-enabled communications group; and/or when there are at least two currently-enabled communications groups, generating information about an amount of to-be-transmitted data, where the information about the amount of the to-be-transmitted data includes identification information of the currently-enabled communications groups, and buffer status reports of logical channel groups corresponding to the currently-enabled communications groups, and the amount of the to-be-transmitted data is an amount of data to be transmitted between the UE and other D2D devices in the currently-enabled communications groups.

According to this embodiment of the present invention, before the UE generates the information about the amount of the to-be-transmitted data, the processing unit is further configured to: when it is determined that a buffer of at least one of the currently-enabled communications groups changes from a state of having no data waiting to be sent to a state of having data waiting to be sent, control the UE to enter a BSR triggering state; or further configured to: when it is determined that a buffer of at least one of the currently-enabled communications groups changes from a state of having no data waiting to be sent to a state of having data waiting to be sent, and a priority of the communications group is higher than a priority of another communications group that has data waiting to be sent, control the UE to enter a triggering state.

According to this embodiment of the present invention, the identification information of the currently-enabled communications group includes an identifier of the logical channel group corresponding to the currently-enabled communications group; and the information about the amount of the to-be-transmitted data includes the identifier of the logical channel group of the currently-enabled communications group, and the buffer status report of the logical channel group corresponding to the currently-enabled communications group.

According to this embodiment of the present invention, that the sending unit is configured to send the information about the amount of the to-be-transmitted data to the base station includes: sending one MAC control element to the base station, where the MAC control element includes information about an amount of to-be-transmitted data of a logical channel group that has data to be sent.

According to this embodiment of the present invention, identifiers of logical channel groups corresponding to different communications groups are different, and identifiers of different logical channel groups of a same communications group are different.

For the foregoing embodiment of the UE, this embodiment is an apparatus embodiment corresponding to the foregoing method embodiment. An effect of this apparatus embodiment is similar to that of the foregoing method embodiment, and details are not described again.

In addition, in addition to performing operations enumerated in the foregoing apparatus embodiment, the processing unit in the UE may perform various operations that are on a UE side except sending and receiving operations in the foregoing method embodiment and are not enumerated in this apparatus embodiment. The sending unit and the receiving unit in the UE may respectively send and receive information on the UE side correspondingly according to a requirement.

According to an embodiment of the present invention, a base station is provided and configured to communicate with user equipment UE, where the user equipment is a device-to-device D2D device, the UE belongs to at least one communications group, each communications group is corresponding to at least one logical channel group, and the base station includes: a receiving unit, configured to receive information that is about an amount of to-be-transmitted data and sent by the UE, where the information about the amount of the to-be-transmitted data includes identification information of a currently-enabled communications group, and a buffer status report of a logical channel group corresponding to the currently-enabled communications group, and the amount of the to-be-transmitted data is an amount of data to be transmitted between the UE and another D2D device in the currently-enabled communications group; a processing unit, configured to allocate a resource to the UE according to the information about the amount of the to-be-transmitted data, where the resource is allocated for the currently-enabled communications group, and send information about the resource to the UE by using a sending unit, where the information includes the identification information of the currently-enabled communications group; and the sending unit, configured to send the information about the resource to the UE.

According to this embodiment of the present invention, the identification information of the currently-enabled communications group includes an index number of the currently-enabled communications group, or includes a unique identifier of the currently-enabled communications group.

According to this embodiment of the present invention, the index number of the currently-enabled communications group is obtained according to a sequence, in a list, of the unique identifier of the currently-enabled communications group, and the list includes unique identifiers of all the currently-enabled communications groups.

Correspondingly, that the processing unit is configured to allocate the resource to the UE according to the information about the amount of the to-be-transmitted data includes: determining the unique identifier of the currently-enabled communications group according to the index number received by the receiving unit and the list, and allocating a resource to the communications group corresponding to information about the unique identifier.

According to this embodiment of the present invention, the receiving unit is further configured to receive the list.

According to this embodiment of the present invention, that the receiving unit is configured to receive the information that is about the amount of the to-be-transmitted data and sent by the UE includes: receiving at least one Media Access Control MAC control element, where each MAC control element includes information about an amount of to-be-transmitted data of one of the currently-enabled communications groups.

According to this embodiment of the present invention, that the receiving unit is configured to receive the information that is about the amount of the to-be-transmitted data and sent by the UE includes: receiving one MAC control element, where the MAC control element includes the information about the amount of the to-be-transmitted data of the currently-enabled communications group that has data to be sent.

According to this embodiment of the present invention, the identification information of the currently-enabled communications group includes an identifier of the logical channel group corresponding to the currently-enabled communications group; and the information about the amount of the to-be-transmitted data includes the identifier of the logical channel group of the currently-enabled communications group, and the buffer status report of the logical channel group of the currently-enabled communications group.

According to this embodiment of the present invention, that the receiving unit is configured to receive the information that is about the amount of the to-be-transmitted data and sent by the UE includes: receiving one MAC control element, where the MAC control element includes information about an amount of to-be-transmitted data of a logical channel group that has data to be sent.

According to this embodiment of the present invention, identifiers of logical channel groups corresponding to different communications groups are different, and identifiers of different logical channel groups of a same communications group are different.

For the foregoing embodiment of the base station, this embodiment is an apparatus embodiment corresponding to the foregoing method embodiment. An effect of this apparatus embodiment is similar to that of the foregoing method embodiment, and details are not described again.

In addition, in addition to performing operations enumerated in the foregoing base station apparatus embodiment, the processing unit in the base station may perform various operations that are on a base station side except sending and receiving operations in the foregoing method embodiment and are not enumerated in the base station apparatus embodiment. The sending unit and the receiving unit in the base station may respectively send and receive information on the base station side correspondingly according to a requirement.

According to an embodiment of the present invention, another user equipment UE is further provided, where the UE is a device-to-device D2D device, the UE belongs to at least one communications group, each communications group is corresponding to at least one logical channel group, and the UE includes: a processor, a receiver, and a sender. The processor in this embodiment is similar to the processing unit in the UE in the foregoing embodiment and can complete a same function. The sender is similar to the sending unit in the UE in the foregoing embodiment and can complete a same function. The receiver is similar to the receiving unit in the UE in the foregoing embodiment and can complete a same function. A connection relationship of the processor, the sender, and the receiver is consistent with a connection relationship of the foregoing processing unit, sending unit, and receiving unit, and is used to solve a same technical problem and obtain a same technical effect, and details are not described herein again.

According to an embodiment of the present invention, another base station is further provided and configured to communicate with user equipment UE, where the user equipment is a device-to-device D2D device, the UE belongs to at least one communications group, each communications group is corresponding to at least one logical channel group, and the base station includes: a receiver, a processor, and a sender. The processor in this embodiment is similar to the processing unit in the base station in the foregoing embodiment and can complete a same function. The sender is similar to the sending unit in the base station in the foregoing embodiment and can complete a same function. The receiver is similar to the receiving unit in the base station in the foregoing embodiment and can complete a same function. A connection relationship of the processor, the sender, and the receiver is consistent with a connection relationship of the foregoing processing unit, sending unit, and receiving unit, and is used to solve a same technical problem and obtain a same technical effect, and details are not described herein again.

Effect of the foregoing another UE and base station are similar to those in the foregoing method embodiments, and details are not described again. The steps in the foregoing methods may be completed by using an integrated logic circuit of hardware in the processor or instructions in a form of software. These instructions may be implemented and controlled by working with the processor in the foregoing methods. Configured to execute the methods disclosed in the embodiments of the present invention, the foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or execute methods, steps and logical block diagrams disclosed in the embodiments of the present invention. A general purpose processor may be a microprocessor or the processor may also be any conventional processor, decoder, and the like. Steps of the methods disclosed with reference to the embodiments of the present invention may be directly executed and accomplished by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A communications method, comprising:
   determining, by a terminal device, identification information of a communications group including the terminal device and corresponding to a logical channel group;

generating, by the terminal device, transmission information about an amount of to-be-transmitted data, the transmission information including the identification information of the communications group, and a buffer status report of the logical channel group corresponding to the communications group, wherein the buffer status report indicates the amount of the to-be-transmitted data waiting to be transmitted in the logical channel group between the terminal device and another terminal device; and sending, by the terminal device, the transmission information to a base station.

2. The method according to claim 1, further comprises:
receiving, by the terminal device from the base station, resource information about a resource allocated by the base station for the communications group, the resource information including the identification information of the communications group; and
transmitting, by the terminal device, communication data in the communications group by using the resource.

3. The method according to claim 2, wherein the sending of the transmission information by the terminal device to the base station comprises:
sending one MAC control element including the transmission information of the communications group that has communication data to be sent.

4. The method according to claim 1, wherein
the identification information of the communications group is a group identifier for proximity service (ProSe).

5. The method according to claim 1, wherein
the buffer status report includes a buffer size.

6. The method according to claim 5, wherein
the buffer status report only provides the buffer size.

7. The method according to claim 1, wherein:
the identification information of the communications group comprises an index number of the communications group.

8. The method according to claim 1, the method further comprises:
entering, by the terminal device, a triggering state upon determination that a buffer of a communications group has changed from a state of having no data waiting to be sent to a state of having data waiting to be sent.

9. The communications method according to claim 1, wherein the communications group is a first communications group, the logical channel group is the first logical channel group, and the method further comprises:
determining, by the terminal device, identification information of a second communications group including the terminal device and corresponding to a second logical channel group; and, wherein
the transmission information further includes the identification information of the second communications group, and a buffer status report of the second logical channel group corresponding to the communications group.

10. A communications method, comprising:
receiving, by a network device from a terminal device, transmission information about an amount of to-be-transmitted data, the transmission information including identification information of a communications group that includes the terminal device, and a buffer status report of a logical channel group corresponding to the communications group, wherein the buffer status report indicates the amount of the to-be-transmitted data waiting to be transmitted in the logical channel group between the terminal device and another terminal device;

allocating, by the network device, a resource to the terminal device in response to the transmission information; and sending resource information about the resource to the terminal device by the network device, the resource information including the identification information of the communications group.

11. The method according to claim 10, wherein
the identification information of the communications group is a group identifier for proximity service (ProSe).

12. The method according to claim 10, wherein
the buffer status report includes a buffer size.

13. The method according to claim 10, wherein:
the identification information of the communications group includes an index number of the communications group.

14. The method according to claim 10, wherein the receiving comprises:
receiving, by the network device, one MAC control element including the transmission information of the communications group that has communication data to be sent.

15. The communications method according to claim 10, wherein the communications group is a first communications group, the logical channel group is the first logical channel group; and, wherein
the transmission information about an amount of to-be-transmitted data further includes identification information of a second communications group that includes the terminal device, and a buffer status report of a second logical channel group corresponding to the second communications group; and
the resource information further includes information indicating a resource allocated to the terminal device for the second communications group.

16. A communication device communicating with a base station, comprising:
a processor; and
a non-transitory memory configured to store an execution instruction that when executed by the processor causes the device to
determine identification information of a communications group including the communication device and corresponding to a logical channel group;
generate transmission information about an amount of to-be-transmitted data, the transmission information including the identification information of the communications group, and a buffer status report of the logical channel group corresponding to the communications group, wherein the buffer status report indicates the amount of the to-be-transmitted data waiting to be transmitted in the logical channel group between the terminal device and another terminal device; and
send the transmission information about to the base station.

17. The communication device according to claim 16, wherein when the execution instruction is executed the device is enabled to
receive from the base station, resource information about a resource allocated by the base station for the communications group, the resource information including the identification information of the communications group; and transmit communication data in the communications group by using the resource.

18. The communication device according to claim 16, wherein
the identification information of the communications group is a group identifier for proximity service (ProSe).

19. The communication device according to claim 16, wherein at least one of the buffer status report includes a buffer size, and
the identification information of the communications group includes an index number of the communications group.

20. The communication device according to claim 16, wherein sending of the transmission information about the amount of the to-be-transmitted data to the base station comprises:
sending one MAC control element to the base station, the MAC control element including the transmission information of the communications group that has communication data to be sent.

* * * * *